(No Model.)
C. E. BUELL.
AUTOMATIC FIRE EXTINGUISHER.
No. 572,404. Patented Dec. 1, 1896.
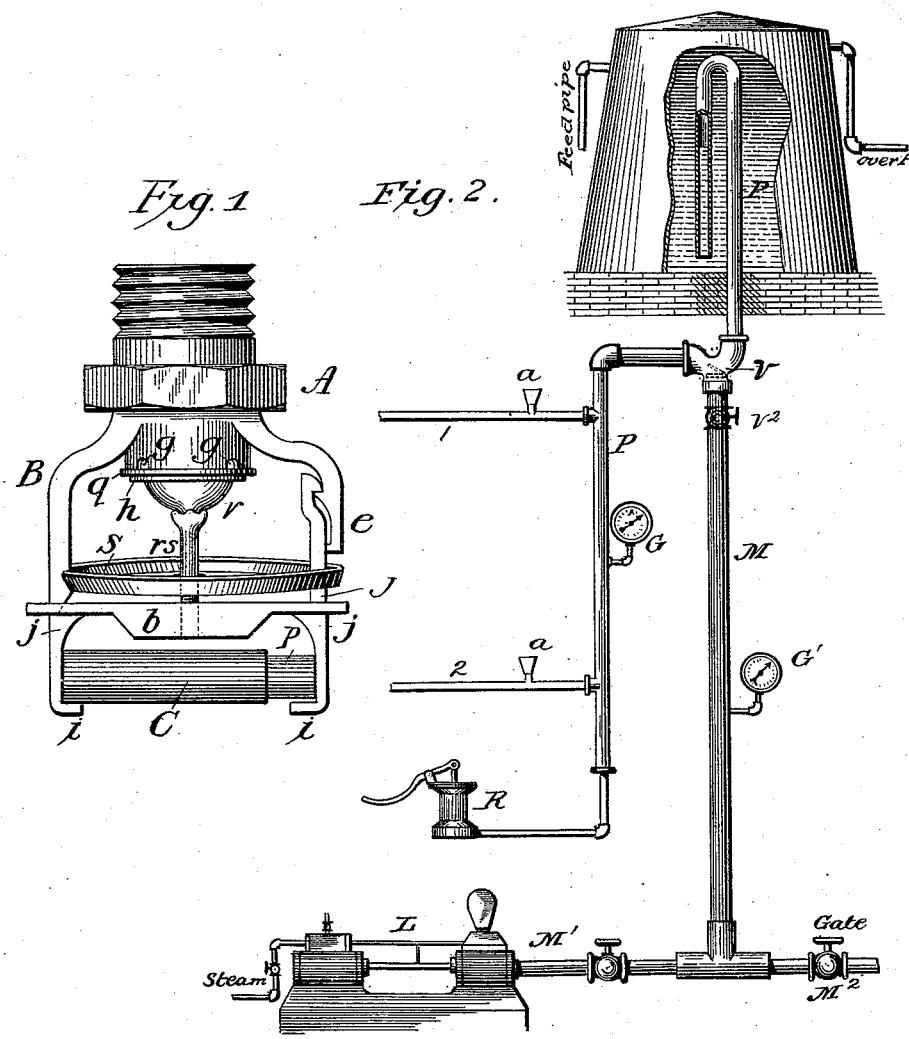
WITNESSES:
Fred G. Dieterich
A. C. Buell
INVENTOR
Charles E. Buell

UNITED STATES PATENT OFFICE.

CHARLES E. BUELL, OF NORTH PLAINFIELD, NEW JERSEY.

AUTOMATIC FIRE-EXTINGUISHER.

SPECIFICATION forming part of Letters Patent No. 572,404, dated December 1, 1896.

Application filed February 25, 1891. Serial No. 382,805. (No model.)

*To all whom it may concern:*

Be it known that I, CHARLES E. BUELL, of North Plainfield, Somerset county, State of New Jersey, have invented Improvements in Automatic Fire-Extinguishers, of which the following is a specification.

My invention consists, primarily, in an automatic fire-extinguisher, of the combination, with a waterway or outlet, of a valve closing the same, a removable part holding the valve to its seat, and a thermomotor adapted, when exposed to abnormal heat, to forcibly remove said removable part.

My invention further consists in the combination, with a fire-extinguisher system, of a reservoir or tank supply of water having connection to and with said system through a pipe that comprises a siphon and that contains a gaseous pressure to normally prevent the water from said tank entering said pipe and system until the same shall have been acted upon by abnormal heat, substantially as hereinafter described.

In the accompanying drawings, Figure 1 represents an automatic fire-extinguisher or sprinkler embodying my invention. Fig. 2 shows a system arranged according to my invention.

Referring to Fig. 1, A represents the body of an automatic sprinkler having a screw-threaded portion for connecting the device to a pipe and with the arm B sustaining a spreader S. An arm J is removably attached by interlocking with a fragment of an arm at *e*. There are projections upon the arms B and J for sustaining the cross-bar *b*, the said cross-bar in turn sustaining the valve-stem *vs*, that holds the valve *v* to its seat. The valve-stem *vs* is screw-threaded and runs in threads in the said cross-bar. The structure thus formed is sustained by the arm J in such a manner that no water can escape from the sprinkler until the arm J is forced completely from its support at *e*. To remove the arm J by the action of heat, I employ an expanding body C, which consists of a suitable tube having a tight-fitting plug *p* and containing a substance or compound that expands at low temperature and by expansion forces the plug *p* outward, forcing the arm J from its support at *e* and releasing the valve *v* and by so doing opening the sprinkler. Referring to Fig. 2, there is shown a tank T, elevated above a system of sprinklers, and a main riser-pipe P, entering to within said tank T and terminating in a siphon, the water in the tank normally covering the highest point of the siphon and being prevented from overflow by the overflow-pipe shown at the top of said tank. Means for keeping the normal level of water in said tank T is shown in the feed-pipe entering at the side of said tank, and through which a sufficient supply for keeping the water to a predetermined level in said tank is caused to flow into the tank.

The riser P connects with branch sprinkler-pipes 1 and 2, in which are the sprinklers *a a*, and to which there is shown an air-pump R, suitably connected for supplying a pressure of air to the system. A pressure-indicator G is shown connected to pipe P.

A main M, leading to an auxiliary water supply, as a steam-pump L or a city water supply, or both, is shown connected to riser P, with a large valve V, that is adapted to open upward toward the tank T when water from the steam-pump L or other supply is turned into pipe M, thus closing the waterway to the tank to prevent overflowing the tank, while such incoming water can go to the sprinklers.

Gate-valves or other controlling-valves are shown at M' M² for controlling the flow of water into and through the said main M, the auxiliary supply being intended for use after the supply in tank T has become exhausted, or partially so.

The large valve V, which is located at the junction of the pipes P and M, is adapted to be made air-tight by water that will settle upon the said valve, forming a liquid seal upon the valve, which would be desirable if the main should not be fitted air-tight.

A pressure-indicator G' is shown connected to main M to at all times show the condition of said main.

What I claim is—

1. In an automatic sprinkler the combination of a sprinkler-head a valve closing the same, a removable part holding the valve to its seat, and a thermomotor adapted, when exposed to abnormal heat, to forcibly remove said removable part.

2. The combination of the following elements, a sprinkler-outlet, a valve closing said outlet, a support for said valve that includes means for forcing said valve to its seat, a laterally-movable latch included in said support, and a thermally-operated motor for forcing the said latch in a lateral direction when acted upon by heat.

3. In an automatic sprinkler the combination of a valve closing the same, means for forcing the said valve to its seat that are adjustable, a movable support for the said valve, and a thermomotor adapted, when exposed to abnormal heat, to forcibly displace said movable support.

4. In a fire-extinguishing system a tank located above the system of sprinklers, a pipe connecting between the said tank and system that comprises a siphon, air-pressure in said pipe and system, and a feed-pipe for said tank, and connections from the first-named pipe and system to an auxiliary supply, substantially as described.

5. The combination of the following elements; a system of sprinklers, a tank above said system, a feed-pipe connected to said tank, a pipe connecting between the said tank and system that comprises a siphon, and that has connections to an auxiliary water supply that includes a valve that is adapted to open toward said tank.

CHARLES E. BUELL.

Witnesses:
A. C. BUELL,
EMMA H. BUELL.